April 30, 1968  V. J. JANOVTCHIK ET AL  3,380,834
FREEZE-DRIED FOOD PACKAGE
Filed May 6, 1963
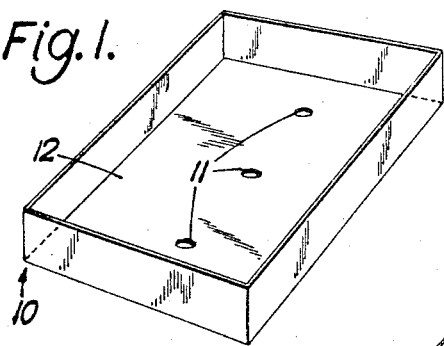
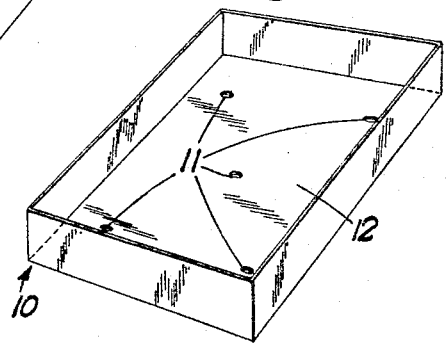
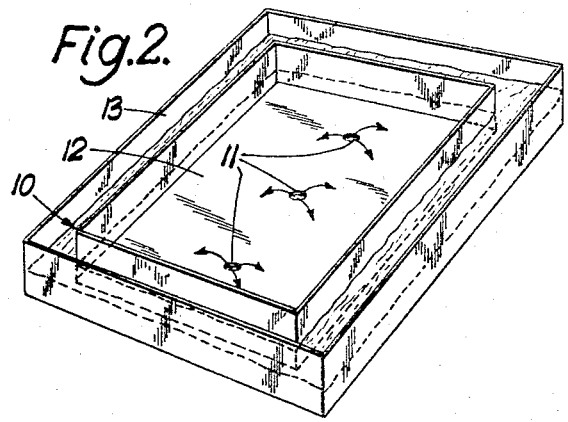

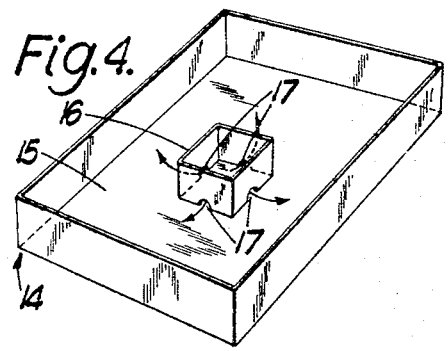
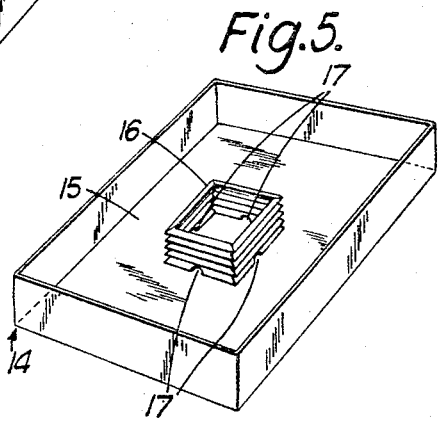
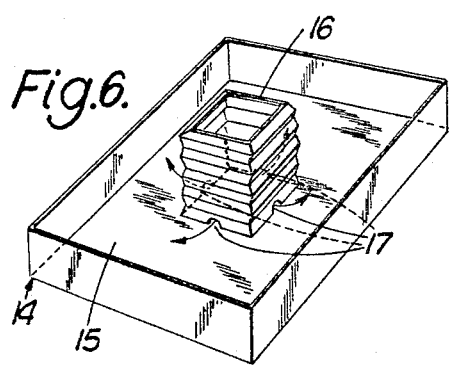

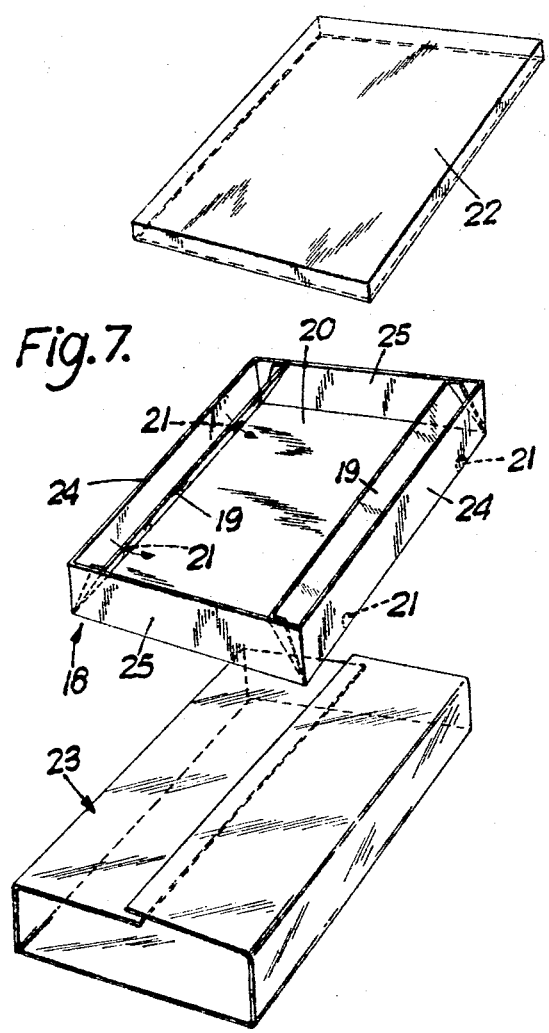

United States Patent Office 3,380,834
Patented Apr. 30, 1968

3,380,834
FREEZE-DRIED FOOD PACKAGE
Vlacheslav Jansen Janovtchik, c/o H. J. Heinz Co. Limited, Harlesden, London NW. 10, England; John Reginald Bartlett, "Dundas," Monkton Combe, near Bath, Somerset, England; and Frederick Arthur George, "Martingale," Westanley, Amersham, Buckinghamshire, England
Filed May 6, 1963, Ser. No. 278,112
Claims priority, application Great Britain, May 7, 1962, 17,469/62
4 Claims. (Cl. 99—171)

This invention relates to methods and equipment for reconstituting freeze-dried foodstuffs including freeze-dried potatoes, potato fingers or chips and has for an object to expedite the reconstitution of such materials.

A dehydrating process usually results in the foodstuff becoming of porous or spongy structure and being permeated with air or other gas which may used in the freeze-drying process. In order to reconstitute freeze-dried material water must be added to the material which adsorbs the water by virtue of the porous structure of the freeze dried material. As the water is absorbed into the material it displaces air or gas from the material and the rate of absorption of water is determined by the structure of the material, the rate of release of air permeating this structure and the manner in which water may be added to the material.

If the whole surface of the material has water applied to it, for example, by immersing the material in the water, or quickly pouring water over it the air within the material is trapped and it takes some considerable time before the water can impregnate the material.

According to this invention a method of reconstituting dehydrated foodstuff and especially freeze-dried foodstuff consists in supplying water at a controlled rate initially to only a part of the surface of the foodstuff whereby the air or gas contained in the pores of the foodstuff will be displaced from the pores through the still dry portion of the foodstuff by the penetration of the water until the whole of the foodstuff is permeated with water.

The rate of water supply should not be substantially greater than the maximum rate at which the foodstuff can absorb it, i.e., at which water can penetrate into and fill the pores of the dried product.

For example the reconstitution of the dehydrated or freeze-dried foodstuff may be carried out within a container into which the foodstuff is placed whereby a quick reconstitution is achieved by allowing water or a watery solution to come into contact with the foodstuff from underneath at a controlled rate of feed which should not be substantially greater than the maximum rate at which the foodstuff can absorb it by virtue of the size and shape of its pores and the rate of expulsion, by rising water, of air or gas permeating the porous structure of the foodstuff.

By adopting this method it is found that freeze-dried potato fingers or chips can be reconstituted in the course of about five or six minutes, whereas if water were poured over it indiscriminately it might take up to thirty or forty minutes to become reconstituted.

Equipment for carrying out the above method may comprise a container in which the dehydrated or freeze-dried foodstuff is packed which container is protected by a hermetically sealed envelope and which container is provided with holes in or near the bottom wall thereof of such size that after the sealed envelope is removed water may be introduced into the tray through the holes at the aforesaid controlled rate whereby the container forms not only the package but also the means for use in the reconstitution of the foodstuff.

The container may comprise a tray for floating on water the bottom wall of which tray is provided with said holes of such size as to restrict flow of water into the tray to a rate not substantially greater than that at which the foodstuff can absorb it.

With this arrangement it is only necessary to free the tray and to place it on the surface of water in an appropriate utensil when the water will pass up through the holes at the required rate of absorption.

The following is a description of a number of different embodiments of the invention reference being made to the accompanying diagrammatic drawings in which:

FIGURE 1 is a perspective view of one form of container before the introduction of the foodstuff and before wrapping;

FIGURE 2 shows the tray of FIGURE 1 floating in water in a suitable utensil;

FIGURE 3 is a similar perspective view to that of FIGURE 1 showing an alternative form of container;

FIGURE 4 is a similar perspective view to that of FIGURE 1 of the container having a water receiving receptacle incorporated in it;

FIGURE 5 is a similar view to that of FIGURE 4 and in which the water receiving receptacle is collapsible;

FIGURE 6 shows the container of FIGURE 5 with the water receiving receptacle in an extended condition; and FIGURE 7 shows a container with alternative form of water receptacle and a lid and wrapping for the container.

The container 10 shown in FIGURE 1, in perspective, is in the form of a tray preferably made of a material wholly or partly impervious to water which may be waxed card, plastics or similar material. The dimensions of the tray are chosen to suit the quantity and nature of the material to be packed. For instance in the case of freeze-dried potato chips, the volumetric capacity of the tray is such as to contain dehydrated or freeze dried potato chips say one to several ounces of the dried chips.

The tray has three holes 11 each of a diameter of about 4 to 5 millimetres spaced apart along a centre line in the bottom wall 12 thereof through which water or water solution for example containing a wetting agent may reach the freeze-dried potato chips. The size and positioning of the holes in the tray restricts the rate of flow of water to a rate not substantially greater than that at which the freeze-dried potato chips can absorb it.

The tray is essentially a protective packaging container which after receiving an appropriate amount of foodstuff is enveloped and sealed in a wrapping of suitable character such as plastic film or similar to protect the foodstuff against damaging agents.

If necessary the wrapped tray with foodstuff may be also inserted into an outside reinforcing envelope made of card, wood, plastic or any other suitable material to give a better protection against the hazards of transport and storage.

To achieve the reconstitution of the foodstuff packed in such a container it is only necessary to remove the tray from the eventual outside envelope, to cut off the wrapping, and to place the tray on the surface of water in a suitable utensil 13 with a sufficient depth, as shown in FIGURE 2, to permit the tray to be completely or nearly completely immersed.

Water will penetrate into the tray through the holes 11 and gradually fill the tray and expel the air from the foodstuff causing the tray to sink whereby the water completely permeates the foodstuff.

The foodstuff will therefore be moistened gradually from underneath, air or gas inside pores expelled upwards, and the reconstitution of the foodstuff will take place within a few minutes.

In order initially to obtain a more uniform distribution of water over the underside of the material more than three holes may be provided in the bottom wall of the container in which case the holes require to be of smaller size as shown in FIGURE 3. Five holes 11 are provided in that arrangement each having a diameter of about 3 to 4 millimetres and water will thus be supplied to the freeze-dried potato chips more uniformly which may be preferable in certain cases.

Another type of the container according to the present invention is shown in FIGURE 4 and is composed again of a tray 14 which holds the freeze-dried foodstuff and which may be again a part of a packaging container.

The tray is plain without any openings or holes but has at the centre of its bottom wall 15 a free area unoccupied by the foodstuff.

To this free area on the base of the tray is attached by a suitable adhesive, for example, glue, a water receiver which may be of the shape of a cup 16, funnel or the like and as shown in FIGURE 4 is rectangular in configuration.

Its height, size and shape may vary but it is characterised by the fact that it has appropriately sized and positioned holes 17 close to the bottom wall of the tray so as to supply water at a rate not substantially greater than than that at which the foodstuff will absorb it.

The foodstuff to be reconstituted is placed on the tray around or on one side of the container affixed to the bottom wall of the tray and the tray may be again wrapped with a protective plastic material.

The tray with the foodstuff upon it are placed inside the protective envelope for dispatch and storage before delivery to a customer.

Before consumption, the reconstitution of the freeze-dried foodstuff will be carried out inside the tray.

The protective wrapping is torn or cut off giving access to the water receiver fixed to the tray. Water is poured into the receiver at a rate so as not to overflow from it and the size of the holes are such that the water is supplied to the bottom of the foodstuff at a rate not substantially greater than that at which the foodstuff will absorb it. Pouring of the water will continue until the tray is filled and the foodstuff submerged.

The size of the water receiver may be such that only one filling with water may be necessary.

In order to provide for a sufficient capacity of the water receiver without taking up too much free space within the tray the receiver may be of a foldable type and as shown in FIGURES 5 and 6 has pleated walls the bottom pleat being secured at the bottom wall of the tray. It will require to be erected as shown in FIGURE 6 before being filled with water which will then represent the exact amount required for the reconstitution of the foodstuff. With this arrangement the water receiver when erected may project well above the top of the tray and its capacity may be nearly equal to the capacity of the tray.

In the embodiment of the tray 18 shown in FIGURE 7 flaps 19 are secured along the junction between each of two opposite sidewalls 24 of the tray and the bottom wall 20 so as to be inclined to the side walls and are also fixed to the end walls 25 thus providing troughs for the reception of water. Holes 21 are provided at the bottom of the flaps.

Water is poured into the troughs and gradually penetrates into the tray through the holes 21. Water may be added several times until the foodstuff within the tray is submerged completely.

In any of the arrangements referred to above the tray may be provided with a lid and wrapping as indicated at 22 and 23 respectively in FIGURE 7.

A number of water receivers constructed in the manner shown in FIGURE 4 or FIGURE 5 may be secured to the bottom wall of the tray.

It is understood that there may be other possible designs of the containers which may be used as packaging material according to the present invention but any form of them will be characterised by the fact that the reconstitution of a dried foodstuff will take place inside the container by the addition of water to the foodstuff from underneath at a controlled rate corresponding approximately to the water absorption capacity of the freeze-dried foodstuff. Also it will be appreciated that instead of the packaging container itself being used for reconstituting the foodstuff an additional separate container, constructed in any of the ways referred to above, may be supplied for this purpose.

We claim:

1. A package containing freeze-dried foodstuff and comprising:
   (a) water impervious container supporting said freeze-dried foodstuff;
   (b) a protective envelope hermetically sealing the impervious container and foodstuff;
   (c) the lower part of said container being provided with a desired number of metering holes, each hole having a diameter of about 3–4 mm. so that after the sealed envelope is removed and the container placed on water surface, the container gradually and slowly sinks under the water surface in virtue of water being admitted into the container from underneath through these holes and being absorbed by the freeze-dried food to bring their reconstitution at an accelerated rate.

2. A package according to claim 1 and wherein there is disposed within the container and secured to the bottom thereof at least one receiver for water provided with the aforesaid metering holes in the lower part thereof and opening into the container.

3. A package according to claim 2 wherein said receiver is provided with pleated walls which when in an extended condition project above the top of the container.

4. A package according to claim 1 wherein a flap is disposed on the inner side of each side wall of said container and is secured to the junction between that wall and the bottom wall to form a water receiving trough and which flap at the lower part thereof is provided with said metering holes.

References Cited

UNITED STATES PATENTS

| | | | |
|---|---|---|---|
| 1,157,045 | 10/1915 | Risher | 220—22 |
| 2,652,335 | 9/1953 | Conti | 99—171 |
| 2,691,337 | 10/1954 | Forrest | 99—171 |
| 3,228,776 | 1/1966 | Savage et al. | 99—171 |

HYMAN LORD, *Primary Examiner.*

R. S. AULL, RAYMOND N. JONES,
*Assistant Examiners.*